(12) United States Patent
Aoyama et al.

(10) Patent No.: US 8,349,064 B2
(45) Date of Patent: Jan. 8, 2013

(54) WATER-BASED INK FOR INK JET RECORDING

(75) Inventors: Michiko Aoyama, Nagoya (JP); Narumi Koga, Nagoya (JP); Shunichi Higashiyama, Yokkaichi (JP); Masashi Tsuda, Ichinomiya (JP); Hiromitsu Sago, Tokai (JP); Kazuma Goto, Nagoya (JP); Akihiko Taniguchi, Kakamigahara (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 13/014,428

(22) Filed: Jan. 26, 2011

(65) Prior Publication Data

US 2011/0187770 A1    Aug. 4, 2011

(30) Foreign Application Priority Data

Jan. 29, 2010  (JP) ................................. 2010-018140
Jan. 29, 2010  (JP) ................................. 2010-018141

(51) Int. Cl.
C09D 11/02    (2006.01)
(52) U.S. Cl. .................... 106/31.6; 106/31.9; 106/31.86
(58) Field of Classification Search ................. 106/31.6, 106/31.9, 31.86
See application file for complete search history.

(56) References Cited

U.S. PATENT DOCUMENTS

| 6,153,001 | A | 11/2000 | Suzuki et al. |
| 6,368,397 | B1 | 4/2002 | Ichizawa et al. |
| 2003/0019398 | A1 | 1/2003 | Komatsu et al. |
| 2004/0119801 | A1 | 6/2004 | Suzuki et al. |
| 2005/0274281 | A1 | 12/2005 | Jackson |
| 2006/0240259 | A1 | 10/2006 | Toyoda et al. |
| 2007/0085887 | A1 | 4/2007 | Iu et al. |
| 2007/0100023 | A1 | 5/2007 | Burns et al. |
| 2007/0100024 | A1 | 5/2007 | Gu et al. |
| 2008/0206465 | A1 | 8/2008 | Han-Adebekun et al. |
| 2008/0241398 | A1 | 10/2008 | Kato et al. |
| 2008/0280042 | A1* | 11/2008 | Yanagimachi et al. ....... 427/256 |
| 2009/0025605 | A1 | 1/2009 | Ishimaru et al. |

FOREIGN PATENT DOCUMENTS

| JP | 11-181340 | 7/1999 |
| JP | 11-181341 A | 7/1999 |
| JP | 2000-204305 | 7/2000 |
| JP | 2002-317132 A | 10/2002 |
| JP | 2005-162898 A | 6/2005 |
| JP | 2005-350576 | 12/2005 |
| JP | 2005-350577 | 12/2005 |
| JP | 2006-291176 A | 10/2006 |
| JP | 2006-299348 A | 11/2006 |
| JP | 2007-302857 | 11/2007 |

(Continued)

OTHER PUBLICATIONS

EP Extended Search Report dtd Apr. 28, 2011, EP Appln. 11250086.3.

(Continued)

*Primary Examiner* — Melvin C Mayes
*Assistant Examiner* — Veronica F Faison
(74) *Attorney, Agent, or Firm* — Banner & Witcoff, Ltd.

(57) ABSTRACT

A water-based ink for ink jet recording, containing: a coloring agent; water; and a water-soluble organic solvent. The coloring agent contains a phosphate group-modified self-dispersing pigment. The water-based ink further contains at least one of a reducing sugar and a sugar alcohol and a calcium ion.

14 Claims, 2 Drawing Sheets

FOREIGN PATENT DOCUMENTS

| | | |
|---|---|---|
| JP | 2008-502790 A | 1/2008 |
| JP | 2008-246821 | 10/2008 |
| JP | 2009-052018 A | 3/2009 |
| JP | 2009-515007 | 4/2009 |
| WO | 01-62862 | 8/2001 |

OTHER PUBLICATIONS

Office Action for corresponding Japanese Patent Application No. 2010-018140 dated Jul. 11, 2012.

Office Action for corresponding Japanese Patent Application No. 2010-018141 dated Jul. 11, 2012.

Office Action for Japanese Patent Application No. 2010-018137 dated Jul. 11, 2012.

Office Action for Japanese Patent Application No. 2010-018138 dated Jul. 11, 2012.

Office Action for Japanese Patent Application No. 2010-018139 dated Jul. 11, 2012.

* cited by examiner

A

B

C

WATER-BASED INK FOR INK JET RECORDING

CROSS-REFERENCE TO RELATED APPLICATION

This application claims priority from Japanese Patent Application Nos. 2010-018140 and 2010-018141 filed on Jan. 29, 2010. The entire subject matter of the Japanese Patent Applications is incorporated herein by reference.

BACKGROUND

There is a case that a self-dispersing pigment is used in a water-based ink for ink jet recording. Since the self-dispersing pigment does not need to use in combination with a polymer pigment dispersant, it can prevent an increase in viscosity of the water-based ink and the water-based ink is superior in ejection stability and storing stability. The self-dispersing pigment can be obtained by treating a pigment to bind with at least one type of hydrophilic group such as a phosphate group, a carboxylic group, or a sulfonate group or a salt thereof. A self-dispersing pigment obtained by treating a pigment specifically by a phosphate group among these hydrophilic groups (hereinafter, also referred to as "phosphate group-modified self-dispersing pigment") can obtain a high optical density (OD) as compared with a self-dispersing pigment obtained by treating a pigment by a carboxylic group or a sulfonate group.

On the other hand, the water-based ink using the self-dispersing pigment obtained by treating a pigment by a phosphate group has a problem in that its redispersibility is not favorable. "Redispersibility" is solubility and dispersibility of a solid substance generated by evaporation of a water-based ink to dryness in the case where the solid substance re-contacts with a water-based ink. When the water-based ink is unfavorable in redispersibility, there is a problem in ejection stability in the case where the water-based ink is evaporated to dryness in an ink flowing path or in proximity to the nozzle of an ink-jet head. There is a demand for the water-based ink for ink jet recording using the phosphate group-modified self-dispersing pigment to further improve an optical density (OD).

SUMMARY

A water-based ink for ink jet recording comprises: a coloring agent; water; and a water-soluble organic solvent. The coloring agent contains a phosphate group-modified self-dispersing pigment. The water-based ink further contains at least one of a reducing sugar and a sugar alcohol and a calcium ion.

An ink cartridge comprises the water-based ink for ink jet recording. As a body of the ink cartridge, a conventionally known body may be used, for example.

An ink-jet recording method comprises performing recording on a recording medium by ejecting the water-based ink for ink jet recording using an ink-jet technique.

An ink-jet recording apparatus comprises: an ink storing portion; and an ink ejection unit. The ink ejection unit ejects an ink stored in the ink storing portion. The water-based ink for ink jet recording is stored in the ink storing portion.

A method for improving redispersibility of a water-based ink for ink jet recording that comprises a phosphate group-modified self-dispersing pigment comprises: adding at least one of a reducing sugar and a sugar alcohol and a calcium ion to the water-based ink.

A method for improving an optical density of a recorded object obtained by performing recording using a water-based ink for ink jet recording that comprises a phosphate group-modified self-dispersing pigment comprises: adding at least one of a reducing sugar and a sugar alcohol and a calcium ion to the water-based ink.

DETAILED DESCRIPTION

Figure 1:
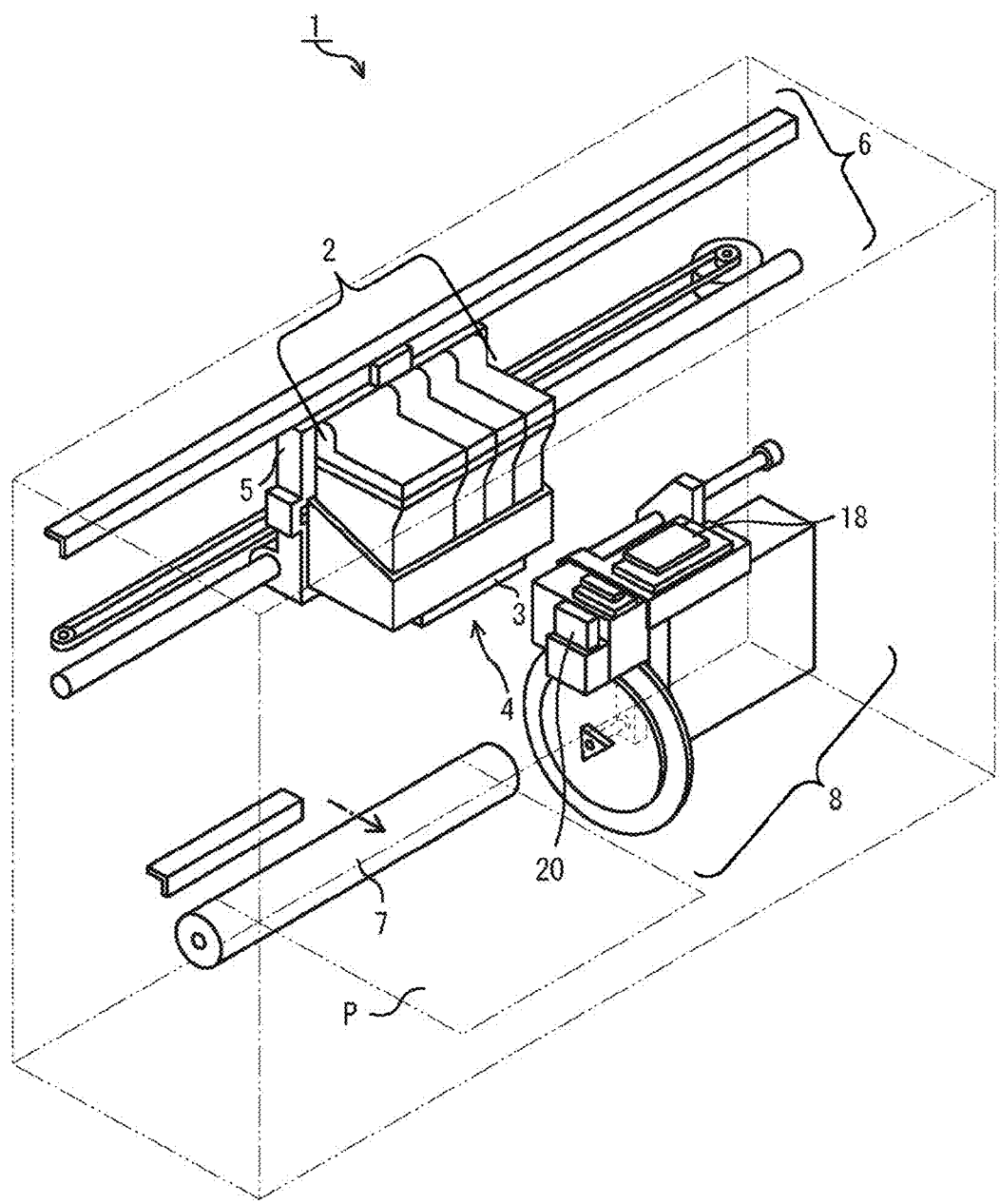
FIG. 1 is a schematic perspective view showing a configuration of an example of the ink-jet recording apparatus.

The water-based ink for ink jet recording (hereinafter, also referred to as a "water-based ink" or an "ink") is explained. The water-based ink contains a coloring agent, water, and a water-soluble organic solvent. As mentioned above, the coloring agent contains the phosphate group-modified self-dispersing pigment. As the phosphate group-modified self-dispersing pigment, one obtained by treating a pigment by the method described in JP 2009-515007 A may be used. As the phosphate group-modified self-dispersing pigment, a commercially available product may be used, for example. The water-based ink may or may not contain a polymer pigment dispersant. In the case where the water-based ink contains a polymer pigment dispersant, the amount of the polymer pigment dispersant to be contained may be an amount by which a viscosity of the water-based ink is not influenced. Since the water-based ink contains a self-dispersing pigment, the water-based ink does not have a problem in viscosity increase caused by a polymer pigment dispersant and may be superior in ejection stability and storing stability.

Examples of a pigment that may be used as a raw material of the self-dispersing pigment include carbon black, an inorganic pigment, and an organic pigment. Examples of the carbon black include furnace black, lamp black, acetylene black, and channel black. Examples of the inorganic pigment include inorganic pigments of titanium oxide, iron oxide, and carbon black. Examples of the organic pigment include: azo pigments such as azo lake, an insoluble azo pigment, a condensed azo pigment, and a chelate azo pigment; polycyclic pigments such as a phthalocyanine pigment, a perylene pigment, a perinone pigment, an anthraquinone pigment, a quinacridone pigment, a dioxazine pigment, a thioindigo pigment, an isoindolinone pigment, and a quinophthalone pigment; a dye lake pigment such as a basic dye lake pigment and an acidic dye lake pigment; a nitro pigment; a nitroso pigment; and an aniline black daylight fluorescent pigment. Examples of the pigment other than these pigments include: C.I. Pigment Black 1, 6, and 7; C.I. Pigment Yellow 1, 2, 3, 12, 13, 14, 15, 16, 17, 55, 78, 150, 151, 154, 180, 185, and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C.I. Pigment Violet 196; C.I. Pigment Blue 1, 2, 3, 15, 15:1, 15:2, 15:3, 15:4, 16, 22, and 60; and C.I. Pigment Green 7 and 36. In particular, the pigment that is suitable for the above-mentioned treatment may be carbon black such as "MA8" or "MA100" manufactured by Mitsubishi Chemical Corporation or "Color Black FW200" manufactured by Evonik Degussa GmbH.

An amount of solid content of the phosphate group-modified self-dispersing pigment to be added (an amount of solid content of pigment) with respect to the total amount of the water-base ink is not particularly limited, and may be set suitably depending on a desired optical density or coloration, for example. The amount of solid content of the pigment is, for example, in the range of 0.1 wt % to 20 wt %, 1 wt % to 10 wt %, and 2 wt % to 8 wt %.

The coloring agent may further contain other pigments and dyes besides the phosphate group-modified self-dispersing pigment.

The water may be ion-exchange water or purified water. The amount of the water to be added with respect to the total amount of the water-based ink (the proportion of the water in the water-based ink) is, for example, in the range of 10 wt % to 90 wt %, and 40 wt % to 80 wt %. The proportion of the water in the water-based ink may be a balance of the other components, for example.

Examples of the water-soluble organic solvent include: a humectant that prevents a water-based ink from drying at a nozzle tip portion of an ink-jet head; and a penetrant that adjusts a drying rate of a water-based ink on a recording medium.

The humectant is not particularly limited, and examples thereof include lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketone such as acetone; ketoalcohol such as diacetone alcohol; ethers such as tetrahydrofuran and dioxane; polyalcohols such as polyalkylene glycol, alkylene glycol, glycerin, and trimethylol propane; 2-pyrrolidone; N-methyl-2-pyrrolidone; and 1,3-dimethyl-2-imidazolidinone. Examples of the polyalkylene glycol include polyethylene glycol and polypropylene glycol. Examples of the alkylene glycol include ethylene glycol, propylene glycol, butylene glycol, diethylene glycol, triethylene glycol, dipropylene glycol, tripropylene glycol, thiodiglycol, and hexylene glycol. These humectants may be used alone or in a combination of two or more of them. Out of these, the humectant may be polyalcohol such as alkylene glycol or glycerin.

The amount of the humectant to be added with respect to the total amount of the water-based ink is, for example, in the range of 0 wt % to 95 wt %, 5 wt % to 80 wt %, and 5 wt % to 50 wt %.

Examples of the penetrant include glycol ethers. Examples of the glycol ethers include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. The penetrants may be used alone or in a combination of two or more of them.

The amount of the penetrant to be added with respect to the total amount of the water-based ink is, for example, in the range of 0 wt % to 20 wt %, 0.1 wt % to 15 wt %, and 0.5 wt % to 10 wt %.

As mentioned above, the water-based ink further contains at least one of a reducing sugar and a sugar alcohol (hereinafter, also referred to as a "specific sugar component") and a calcium ion. Containing the specific sugar component and a calcium ion enables a water-based ink to obtain superior respersibility and a high optical density (OD).

Examples of the reducing sugar include glucose, mannose, galactose, fructose, arabinose, ribose, xylose, erythrose, glyceraldehyde, lactose, maltose, dihydroxyacetone, erythrulose, xylulose, ribulose, psicose, sorbose, tagatose, sedoheptulose, coriose, threose, lyxose, allose, talose, gulose, altrose, and idose. The reducing sugar may be at least one of glucose and xylose. In the case where both of D and L forms are present in the reducing sugar, any one of them or a mixture of both forms may be used. Similarly, in the case where d form (dextrorotation, (+)) and l form (levorotation, (−)) are present in the reducing sugar, any one of them or a mixture of both forms may be used. The amount of the reducing sugar to be added with respect to the total amount of the water-based ink is, for example, in the range of 0.01 wt % to 30 wt %, 0.05 wt % to 20 wt %, and 0.2 wt % to 10 wt %.

Examples of the sugar alcohol includes sorbitol (another name: glucitol), mannitol, iditol, talitol, dulcitol, allodulcitol (another name: allitol), xylitol, ribitol (another name: adonitol), arabitol, meso-erythritol, threitol, isomalt, lactitol, maltitol, volemitol, and perseitol. Out of these, the sugar alcohol may be sorbitol, mannitol, or xylitol from the viewpoint of solubility and ease of obtaining. The sugar alcohol may be at least one of sorbitol and mannitol. In the case where both of D and L forms are present in the sugar alcohol, any one of them or a mixture of both forms may be used. The amount of the sugar alcohol to be added with respect to the total amount of the water-based ink is, for example, in the range of 0.01 wt % to 20 wt %, 0.05 wt % to 12 wt %, and 0.2 wt % to 8 wt %.

A method for adding the calcium ion to the water-based ink is not particularly limited, and for example, the calcium ion may be added as a salt composed of the calcium ion and an anion binding to the calcium ion or an aqueous solution thereof. The anion is not particularly limited, and examples thereof include a bromide ion, a chloride ion, a nitrate ion, an acetate ion, a lactate ion, and a sulfate ion. The amount of the calcium ion to be added with respect to the total amount of the water-based ink (proportion of the calcium ion in the water-based ink) is, for example, in the range of above 0 ppm to 500 ppm, 5 ppm to 300 ppm, and 10 ppm to 150 ppm.

The water-based ink may further contain a conventionally known additive as required. Examples of the additive include a surfactant, a pH adjuster, a viscosity modifier, a surface tension modifier, and a mildew proofing agent. Examples of the viscosity modifier include polyvinyl alcohol, cellulose, and a water-soluble resin.

The water-based ink may be prepared by uniformly mixing a coloring agent, water, a water-soluble organic solvent, the specific sugar component, a calcium ion, and other components to be added as required by a conventionally known method, and then removing precipitates with a filter, for example.

The ink-jet recording method using the water-based ink may be performed using, for example, the ink-jet recording apparatus. The recording includes recording of letters; images; printing; and the like.

As shown in FIG. 1, the ink-jet recording apparatus 1 includes, as main components, four ink cartridges 2, an ink ejecting unit (an ink-jet head) 3, a head unit 4, a carriage 5, a drive unit 6, a platen roller 7, and a purge unit 8, for example.

The four ink cartridges 2 contain water-based inks of four colors, namely, yellow, magenta, cyan, and black, respectively. For example, the water-based black ink is the water-based ink for ink jet recording. The ink-jet head 3 arranged in the head unit 4 performs recording on a recording medium (for example, a recording paper) P. The four ink cartridges 2 and the head unit 4 are mounted on the carriage 5. The drive unit 6 reciprocates the carriage 5 in a straight line. As the drive unit 6, a conventionally known drive unit may be used (see JP 2008-246821 A, for example). The platen roller 7 extends in the reciprocating direction of the carriage 5 and is arranged so as to face to the ink-jet head 3.

The recording paper P is fed from a paper feeding cassette (not shown) positioned on a side of or below the ink-jet recording apparatus 1. The recording medium P is introduced between the ink-jet head 3 and the platen roller 7. Then, a predetermined recording is performed on the introduced recording medium P with the water-based ink ejected from the ink-jet head 3. The water-based ink is superior in redispersibility so that poor ejection does not occur even when the water-based ink is heated in the ink-jet head 3. The recorded recording paper P then is discharged from the ink-jet recording apparatus 1. The recorded object is obtained by performing recording using the water-based ink containing the specific sugar component so that an optical density (OD) becomes high. In FIG. 1, a feeding mechanism and a discharging mechanism of the recording medium P are not shown.

The purge unit 8 draws poor inks containing, for example, air bubbles trapped inside the ink-jet head 3. As the purge unit 8, a conventionally known purge unit may be used (see JP 2008-246821 A, for example).

On the platen roller 7 side of the purge unit 8, a wiper member 20 is provided adjacent to the purge unit 8. The wiper member 20 has a spatula shape, and wipes a nozzle-formed surface of the ink-jet head 3 accompanying the movement of the carriage 5. In FIG. 1, a cap 18 covers a plurality of nozzles of the ink-jet head 3, which returns to the reset position after completion of the recording, in order to prevent the inks from drying.

In the ink-jet recording apparatus, the four ink cartridges may be mounted on a plurality of carriages. Alternatively, the four ink cartridges may not be mounted on the carriage, but may be arranged and fixed in the ink-jet recording apparatus. In such an embodiment, for example, the ink cartridges are connected to the head unit mounted on the carriage via a tube or the like, and the inks are supplied to the head unit from the ink cartridges.

In the apparatus shown in FIG. 1, a serial-type ink-jet head is employed, but the ink-jet recording apparatus may be an apparatus in which a line-type ink-jet head is employed.

In the ink-jet recording method, the method for improving redispersibility of the water-based ink for ink jet recording, and the method for improving an optical density of a recorded object, the types, amounts to be added, and forms of various components such as a coloring agent, the specific sugar component, a calcium ion, and the like may be the same as those of the water-based ink for ink jet recording.

EXAMPLES

Next, the examples are explained together with the comparative examples. It is to be noted that the present invention is not limited by the following examples and comparative examples.

Examples 1 to 8 and Comparative Examples 1 to 23

Components shown in the water-based ink composition (Tables 1 and 2) except an aqueous dispersion of a self-dispersing carbon black were uniformly mixed so as to obtain an ink solvent. Then, the ink solvent was added to the aqueous dispersion of the self-dispersing carbon black, and they were mixed uniformly. Thereafter, the mixture thus obtained was filtered with an acetyl cellulose membrane filter (with a pore size of 3.00 μm) manufactured by Toyo Roshi Kaisha, Ltd. Thus, the respective water-based inks for ink jet recording of Examples 1 to 8 and Comparative Examples 1 to 23 were obtained.

With respect to the water-based inks of the examples and the comparative examples, (a) evaluation of redispersibility, (b) measurement of optical density (OD) were conducted by the following methods.

(a) Redispersibility Evaluation

12 μl of each of the water-based inks of the examples and the comparative examples was placed on a slide glass. The slide glass was then stood still overnight at 100° C. so as to evaporate to dryness. Next, three drops of water were dropped on the solid substance obtained after the evaporation to dryness using a dropper. The evaluation sample thus produced was observed by the naked eye and a microscope with a 50-fold magnification, and redispersibility of the water-based ink was evaluated by visual check according to the following evaluation criteria.

Evaluation Criteria of Redispersibility Evaluation

Figure 2:
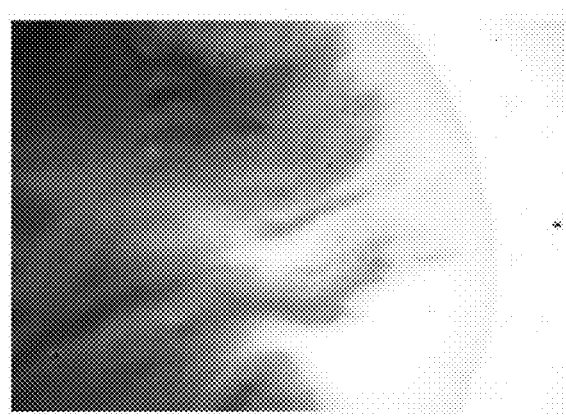
FIGS. 2A to 2C are illustrations showing evaluation criteria of redispersibility in the examples.
Figure 2:
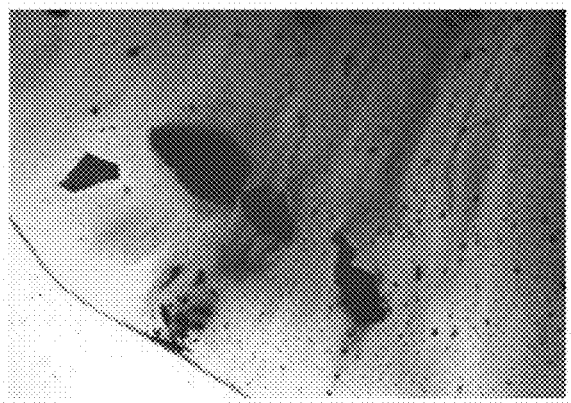
Figure 2:

A: As shown in FIG. 2A, it was observed even by a microscope that the solid substance was completely dissolved or dispersed in water.

B+: The solid substance was observed as if it was completely dissolved or dispersed in water by the naked eye, while the remains that were not dissolved or dispersed in water were observed by a microscope.

B: The solid substance was gradually dissolved or dispersed in water, while the remains that were not dissolved or dispersed in water were observed even by the naked eye, and was observed as shown in FIG. 2B by a microscope.

B−: The solid substance was dissolved or dispersed to an extent that water is slightly colored, but lumps of the solid substance were also observed as they were.

C: As shown in FIG. 2C, the solid substance was not at all dissolved or dispersed in water, and lumps of the solid substance that were remained as they are were observed by a microscope.

(b) Optical Density (OD) Measurement

An image including a single patch of black was recorded on plain papers with each of the water-based inks of the examples and the comparative examples using a digital multifunction center DCP-385C mounted an ink-jet printer manufactured by Brother Industries, Ltd at a resolution of 600 dpi×600 dpi. Thus, evaluation samples were produced. Optical densities (OD) of each of the evaluation samples were measured by a spectrocolorimeter, SpectroEye (light source: $D_{50}$, concentration standard: ANSI T, White base: Abs, internal filter: No), manufactured by X-Rite Incorporated. As the plain papers, Laser Print (plain paper 1) manufactured by Hammer Mill, and Business (plain paper 2) and Recycled Supreme (plain paper 3) manufactured by XEROX Corporation were used. The measurement of the optical density (OD) was conducted five times with respect to each plain paper.

The ink composition and evaluation results of the respective water-based inks of the examples were summarized in Table 1. The ink composition and the evaluation results of the respective water-based inks of the comparative examples were summarized in Table 3. In Tables 1 and 3, the measurement result of optical density (OD) of each of the plain papers is an average value of the results of five-time measurements, and "average of three papers" (the bottom in the tables) means an average value of measurement results of three papers, obtained by dividing the sum of the average values (of five-time measurements) of the plane papers 1 to 3 by 3.

TABLE 1

|  |  | Examples ||||||||
|---|---|---|---|---|---|---|---|---|---|
|  |  | 1 | 2 | 3 | 4 | 5 | 6 | 7 | 8 |
| Ink composition (wt %) | Aqueous dispersion of phosphate group-modified self-dispersing carbon black (*1) | 4.0 | 4.0 | 4.0 | 4.0 | 4.0 | 4.0 | 4.0 | 4.0 |
|  | Glycerin | 10.0 | 10.0 | 10.0 | — | 10.0 | 10.0 | 10.0 | — |
|  | Trimethylol propane | 5.0 | 5.0 | 5.0 | — | 5.0 | 5.0 | 5.0 | — |
|  | Diethylene glycol | — | — | — | 10.0 | — | — | — | 10.0 |
|  | 2-pyrrolidone | — | — | — | 5.0 | — | — | — | 5.0 |
|  | Acethylenol ® E40 (*4) | — | — | — | 0.15 | — | — | — | 0.15 |
|  | Acethylenol ® E100 (*5) | 0.3 | 0.3 | 0.3 | — | 0.3 | 0.3 | 0.3 | — |
|  | D(+)-glucose | 5.0 | 0.2 | 10.0 | — | — | — | — | — |
|  | D(+)-xylose | — | — | — | 3.0 | — | — | — | — |
|  | D-sorbitol | — | — | — | — | 5.0 | 0.2 | — | 3.0 |
|  | D-mannitol | — | — | — | — | — | — | 8.0 | — |
|  | 5.89 wt % calcium nitrate tetrahydrate solution | 1.5 | 1.5 | 1.0 | 0.1 | 1.5 | 1.5 | 1.0 | 0.1 |
|  | Water | Balance | Balance | Balance | Balance | Balance | Balance | Balance | Balance |
|  | Proportion of calcium ion (ppm) | 150 | 150 | 100 | 10 | 150 | 150 | 100 | 10 |
| Evaluation | Redispersibility | A | B | A | B+ | B+ | B− | A | B |
|  | Optical density (OD) |  |  |  |  |  |  |  |  |
|  | plain paper 1 (*6) | 1.38 | 1.46 | 1.29 | 1.41 | 1.38 | 1.48 | 1.33 | 1.40 |
|  | plain paper 2 (*7) | 1.33 | 1.41 | 1.25 | 1.31 | 1.32 | 1.41 | 1.25 | 1.30 |
|  | plain paper 3 (*8) | 1.43 | 1.47 | 1.29 | 1.41 | 1.40 | 1.54 | 1.33 | 1.43 |
|  | Average of three plain papers | 1.38 | 1.45 | 1.28 | 1.38 | 1.37 | 1.48 | 1.30 | 1.38 |

TABLE 2

|  |  | Comparative Examples ||||||||||||
|---|---|---|---|---|---|---|---|---|---|---|---|---|---|
|  |  | 1 | 2 | 3 | 4 | 5 | 6 | 7 | 8 | 9 | 10 | 11 | 12 |
| Ink composition (wt %) | Aqueous dispersion of phosphate group-modified self-dispersing carbon black (*1) | 4.0 | 4.0 | 4.0 | 4.0 | 4.0 | 4.0 | 4.0 | 4.0 | 4.0 | 4.0 | 4.0 | — |
|  | CAB-O-JET ® 300 (*2) | — | — | — | — | — | — | — | — | — | — | — | 26.7 (4.0) |
|  | CAB-O-JET ® 200 (*3) | — | — | — | — | — | — | — | — | — | — | — | — |
|  | Glycerin | 10.0 | — | 10.0 | 10.0 | 10.0 | 10.0 | 10.0 | 10.0 | 10.0 | 10.0 | — | 10.0 |
|  | Trimethylol propane | 5.0 | — | 5.0 | 5.0 | 5.0 | 5.0 | 5.0 | 5.0 | 5.0 | 5.0 | — | 5.0 |
|  | Diethylene glycol | — | 10.0 | — | — | — | — | — | — | — | — | 10.0 | — |
|  | 2-pyrrolidone | — | 5.0 | — | — | — | — | — | — | — | — | 5.0 | — |
|  | Acethylenol ® E40 (*4) | — | 0.15 | — | — | — | — | — | — | — | — | 0.15 | — |
|  | Acethylenol ® E100 (*5) | 0.3 | — | 0.3 | 0.3 | 0.3 | 0.3 | 0.3 | 0.3 | 0.3 | 0.3 | — | 0.3 |
|  | D(+)-glucose | — | — | — | — | — | — | 5.0 | 0.2 | 10.0 | 16.0 | — | — |
|  | D(+)-xylose | — | — | — | — | — | — | — | — | — | — | 3.0 | — |
|  | D-sorbitol | — | — | — | — | — | — | — | — | — | — | — | — |
|  | D-mannitol | — | — | — | — | — | — | — | — | — | — | — | — |
|  | 5.89 wt % calcium nitrate tetrahydrate solution | — | — | 0.1 | 0.5 | 1.0 | 1.5 | — | — | — | — | — | — |
|  | Water | balance | balance | balance | balance | balance | balance | balance | balance | balance | balance | balance | balance |
| Proportion of calcium ion (ppm) |  | 0 | 0 | 10 | 50 | 100 | 150 | 0 | 0 | 0 | 0 | 0 | 0 |

|  |  | Comparative Examples |||||||||||
|---|---|---|---|---|---|---|---|---|---|---|---|
|  |  | 13 | 14 | 15 | 16 | 17 | 18 | 19 | 20 | 21 | 22 | 23 |
| Ink composition (wt %) | Aqueous dispersion of phosphate group-modified self-dispersing carbon black (*1) | — | — | — | — | — | 4.0 | 4.0 | 4.0 | 4.0 | — | — |
|  | CAB-O-JET ® 300 (*2) | 26.7 (4.0) | 26.7 (4.0) | — | — | — | — | — | — | — | 26.7 (4.0) | — |
|  | CAB-O-JET ® 200 (*3) | — | — | 20.0 (4.0) | 20.0 (4.0) | 20.0 (4.0) | — | — | — | — | — | 20.0 (4.0) |
|  | Glycerin | 10.0 | 10.0 | 10.0 | 10.0 | 10.0 | 10.0 | 10.0 | 10.0 | — | 10.0 | 10.0 |
|  | Trimethylol propane | 5.0 | 5.0 | 5.0 | 5.0 | 5.0 | 5.0 | 5.0 | 5.0 | — | 5.0 | 5.0 |
|  | Diethylene glycol | — | — | — | — | — | — | — | — | 10.0 | — | — |

TABLE 2-continued

|  | | | | | | | | | | | |
|---|---|---|---|---|---|---|---|---|---|---|---|
| 2-pyrrolidone | — | — | — | — | — | — | — | — | 5.0 | — | — |
| Acethylenol ® E40 (*4) | — | — | — | — | — | — | — | — | 0.15 | — | — |
| Acethylenol ® E100 (*5) | 0.3 | 0.3 | 0.3 | 0.3 | 0.3 | 0.3 | 0.3 | 0.3 | — | 0.3 | 0.3 |
| D(+)-glucose | — | 5.0 | — | — | 5.0 | — | — | — | — | — | — |
| D(+)-xylose | — | — | — | — | — | — | — | — | — | — | — |
| D-sorbitol | — | — | — | — | — | 5.0 | 0.2 | — | 3.0 | 5.0 | 5.0 |
| D-mannitol | — | — | — | — | — | — | — | 8.0 | — | — | — |
| 5.89 wt % calcium nitrate tetrahydrate solution | 1.5 | 1.5 | — | 1.5 | 1.5 | — | — | — | — | 1.5 | 1.5 |
| Water | balance | balance | balance | balance | balance | balance | balance | balance | balance | balance | balance |
| Proportion of calcium ion (ppm) | 150 | 150 | 0 | 150 | 150 | 0 | 0 | 0 | 0 | 150 | 150 |

TABLE 3

| | Comparative Examples | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| Evaluation | Redispersibility | C | C | C | C | C | C | A | B | A | A | B+ | B |
| | Optical density (OD) | | | | | | | | | | | | |
| | plain paper 1 (*6) | 1.28 | 1.38 | 1.31 | 1.36 | 1.38 | 1.44 | 1.25 | 1.28 | 1.19 | 1.13 | 1.38 | 1.05 |
| | plain paper 2 (*7) | 1.27 | 1.29 | 1.28 | 1.30 | 1.32 | 1.39 | 1.21 | 1.25 | 1.19 | 1.11 | 1.29 | 1.12 |
| | plain paper 3 (*8) | 1.25 | 1.42 | 1.31 | 1.33 | 1.36 | 1.47 | 1.23 | 1.26 | 1.17 | 1.06 | 1.39 | 1.09 |
| | Average of three plain papers | 1.27 | 1.36 | 1.30 | 1.33 | 1.35 | 1.43 | 1.23 | 1.26 | 1.18 | 1.10 | 1.35 | 1.09 |

| | | Comparative Examples | | | | | | | | | | |
|---|---|---|---|---|---|---|---|---|---|---|---|---|
| | | 13 | 14 | 15 | 16 | 17 | 18 | 19 | 20 | 21 | 22 | 23 |
| Evaluation | Redispersibility | B | agglutination | A | A | A | A | B | A | B | B− | A |
| | Optical density (OD) | | | | | | | | | | | |
| | plain paper 1 (*6) | 1.15 | | 0.99 | 1.03 | 1.00 | 1.24 | 1.28 | 1.21 | 1.38 | 1.11 | 1.01 |
| | plain paper 2 (*7) | 1.13 | | 1.06 | 1.07 | 1.04 | 1.21 | 1.25 | 1.20 | 1.29 | 1.10 | 1.03 |
| | plain paper 3 (*8) | 1.27 | | 0.97 | 1.03 | 0.97 | 1.20 | 1.26 | 1.18 | 1.35 | 1.24 | 0.97 |
| | Average of three plain papers | 1.18 | | 1.01 | 1.04 | 1.00 | 1.22 | 1.26 | 1.20 | 1.34 | 1.15 | 1.00 |

Footnotes of Tables 1 to 3
(*1): The aqueous dispersion was prepared by the method described in JP 2009-515007 A
(*2): Aqueous dispersion of carboxylic group-modified self-dispersing carbon black, with a carbon black concentration of 15 wt %, manufactured by Cabot Corporation, a number in parentheses represents a solid content of pigment.
(*3): Aqueous dispersion of carboxylic group-modified self-dispersing carbon black, with a carbon black concentration of 20 wt %, manufactured by Cabot Corporation, a number in parentheses represents a solid content of pigment.
(*4): POE(4) acethylene glycol, manufactured by KAWAKEN FINE CHEMICALS CO. LTD.
(*5): POE(10) acethylene glycol, manufactured by KAWAKEN FINE CHEMICALS CO. LTD.
(*6): Laser Print, manufactured by Hammer Mill
(*7): Business, manufactured by XEROX Corporation
(*8): Recycled Supreme, manufactured by XEROX Corporation As summarized in Tables 1 to 3, water-based inks of Examples 1 to 3 and 5 to 7, each containing a specific sugar component and a calcium ion, were superior in redispersibility and had high optical densities (OD) as compared with a water-based ink of Comparative Example 1, having the same composition as those of Examples 1 to 3 and 5 to 7 except containing no specific sugar component and calcium ion. Similarly, water-based inks of Examples 4 and 8, each containing a specific sugar component and a calcium ion, were superior in redispersibility and had high optical densities (OD) as compared with the water-based ink of Comparative Example 2, having the same composition as those of Examples 4 and 8 except containing no specific sugar component and calcium ion.

Water-based inks of Comparative Examples 3 to 6, each containing a calcium ion but no specific sugar component, were inferior in rediepserbility as compared with the water-based inks of the examples. It is considered from the results of Comparative examples 3 to 6 that in the case of containing no specific sugar component, the higher the proportion of the calcium ion, the higher the optical density (OD).

Water-based inks of Comparative Examples 7 to 11, each containing a reducing sugar but no calcium ion, had low optical densities (OD) as compared with the water-based inks of the examples.

Water-based inks of Comparative Examples 12, 13, and 22, each containing a carboxylic group-modified self-dispersing carbon black as substitute for a phosphate group-modified self-dispersing carbon black and water-based inks of Comparative Examples 15 to 17 and 23, each containing a sulfonate group-modified self-dispersing carbon black as substitute for the same, had significantly low optical densities (OD) as compared with the water-based inks of the examples. In a water-based ink of Comparative Example 14, containing a carboxylic group-modified self-dispersing carbon black as substitute for a phosphate group-modified self-dispersing carbon black, when a reducing sugar and a calcium ion were added to the water-based ink, agglutination occurred, and thus, evaluations of redispersibility and a measurement of optical density (OD) could not be conducted.

The water-based inks of Comparative Examples 18 to 20, each containing a sugar alcohol but no calcium ion, had low optical densities (OD) as compared with the water-based inks of Examples 5 to 7, each having the same composition as that of Comparative Examples 18 to 20 except containing no calcium ion. Similarly, a water-based ink of Comparative Example 21, containing a sugar alcohol but no calcium ion, had low optical densities (OD) as compared with the water-based ink of Example 8, having the same composition as that of Comparative Example 21 except containing a calcium ion.

It will be obvious to those having skill in the art that many changes may be made in the above-described details of the particular aspects described herein without departing from the spirit or scope of the invention as defined in the appended claims.

What is claimed is:

1. A water-based ink for ink jet recording, comprising:
a coloring agent;
water; and
a water-soluble organic solvent, wherein
the coloring agent comprises a phosphate group-modified self-dispersing pigment, and
the water-based ink further comprises (i) a calcium ion and (ii) at least one of a reducing sugar and a sugar alcohol; wherein at least one of the following Condition 1 and Condition 2 is satisfied:
Condition 1
The amount of the reducing sugar with respect to the total amount of the water-based ink is in the range of 0.05 wt % to 20 wt %, and the amount of the calcium ion with respect to the total amount of the water-based ink is in the range of 5 ppm to 300 ppm;
Condition 2
The amount of the sugar alcohol with respect to the total amount of the water-based ink is in the range of 0.05 wt % to 12 wt %, and the amount of the calcium ion with respect to the total amount of the water-based ink is in the range of 5 ppm to 300 ppm.

2. The water-based ink for ink jet recording according to claim 1, wherein the phosphate group-modified self-dispersing pigment is self-dispersing carbon black.

3. The water-based ink for ink jet recording according to claim 1, wherein the reducing sugar is at least one of glucose and xylose.

4. The water-based ink for ink jet recording according to claim 1, wherein the sugar alcohol is at least one of sorbitol and mannitol.

5. The water-based ink for ink jet recording according to claim 1, wherein the reducing sugar is at least one of D(+)-glucose and D(+)-xylose.

6. The water-based ink for ink jet recording according to claim 1, wherein the sugar alcohol is at least one of D-sorbitol and D-mannitol.

7. An ink cartridge, comprising a water-based ink for ink jet recording, wherein the water-based ink is the water-based ink for ink jet recording according to claim 1.

8. The water-based ink for ink jet recording according to claim 1, wherein at least one of the following Condition 1' and Condition 2' is satisfied:
Condition 1'
The amount of the reducing sugar with respect to the total amount of the water-based ink is in the range of 0.2 wt % to 10 wt %, and the amount of the calcium ion with respect to the total amount of the water-based ink is in the range of 10 ppm to 150 ppm;
Condition 2'
The amount of the sugar alcohol with respect to the total amount of the water-based ink is in the range of 0.2 wt % to 8 wt %, and the amount of the calcium ion with respect to the total amount of the water-based ink is in the range of 10 ppm to 150 ppm.

9. The water-based ink for ink jet recording according to claim 1, wherein the amount of the calcium ion with respect to the total amount of the water-based ink is in the range from 100 ppm to 150 ppm.

10. The water-based ink for ink jet recording according to claim 1, wherein the calcium ion is derived from calcium nitrate.

11. An inkjet recording method, comprising:
performing recording on a recording medium by ejecting a water-based ink for ink jet recording, wherein
as the water-based ink, the water-based ink for ink jet recoding according to claim 1 is used.

12. An ink jet recording apparatus, comprising:
an ink storing portion; and
an ink ejection unit, the ink ejection unit ejecting an ink stored in the ink storing portion, wherein
the water-based ink for ink jet recording according to claim 1 is stored in the ink storing portion.

13. A method for improving redispersibility of a water-based ink for ink jet recording that comprises a phosphate group-modified self-dispersing pigment, comprising:
adding (i) a calcium ion and (ii) at least one of a reducing sugar and a sugar alcohol to the water-based ink; wherein at least one of the following Condition 1 and Condition 2 is satisfied:
Condition 1
The amount of the reducing sugar with respect to the total amount of the water-based ink is in the range of 0.05 wt % to 20 wt %, and the amount of the calcium ion with respect to the total amount of the water-based ink is in the range of 5 ppm to 300 ppm;
Condition 2
The amount of the sugar alcohol with respect to the total amount of the water-based ink is in the range of 0.05 wt % to 12 wt %, and the amount of the calcium ion with respect to the total amount of the water-based ink is in the range of 5 ppm to 300 ppm.

14. A method for improving an optical density of a recorded object obtained by performing recording with a water-based ink for ink jet recording that comprises a phosphate group-modified self-dispersing pigment, comprising:
adding (i) a calcium ion and (ii) at least one of a reducing sugar and a sugar alcohol to the water-based ink; wherein at least one of the following Condition 1 and Condition 2 is satisfied:
Condition 1
The amount of the reducing sugar with respect to the total amount of the water-based ink is in the range of 0.05 wt % to 20 wt %, and the amount of the calcium ion with respect to the total amount of the water-based ink is in the range of 5 ppm to 300 ppm;
Condition 2
The amount of the sugar alcohol with respect to the total amount of the water-based ink is in the range of 0.05 wt % to 12 wt %, and the amount of the calcium ion with respect to the total amount of the water-based ink is in the range of 5 ppm to 300 ppm.

* * * * *